United States Patent
Wongpaisarnsin et al.

(10) Patent No.: US 7,536,516 B2
(45) Date of Patent: May 19, 2009

(54) SHARED MEMORY DEVICE

(75) Inventors: Goragot Wongpaisarnsin, Tokyo (JP); Kazuo Taniguchi, Chiba (JP); Masayuki Miyabayashi, Kanagawa (JP)

(73) Assignee: Sony Corporation (JP)

( * ) Notice: Subject to any disclaimer, the term of this patent is extended or adjusted under 35 U.S.C. 154(b) by 79 days.

(21) Appl. No.: 11/344,080

(22) Filed: Feb. 1, 2006

(65) Prior Publication Data

US 2006/0179256 A1 Aug. 10, 2006

(30) Foreign Application Priority Data

Feb. 10, 2005 (JP) ............................. 2005-034445

(51) Int. Cl.
*G06F 13/28* (2006.01)
(52) U.S. Cl. ...................................... 711/148; 711/149
(58) Field of Classification Search ................. 711/147, 711/148
See application file for complete search history.

(56) References Cited

U.S. PATENT DOCUMENTS 6,167,489 A * 12/2000 Bauman et al. ............. 711/145
7,047,371 B2 * 5/2006 Dortu ......................... 711/154
2005/0120182 A1 * 6/2005 Koster et al. ................ 711/141
2005/0268024 A1 * 12/2005 Seo et al. ....................... 711/5

* cited by examiner

*Primary Examiner*—Reginald G Bragdon
*Assistant Examiner*—Baboucarr Faal
(74) *Attorney, Agent, or Firm*—Rader Fishman & Grauer PLLC; Ronald P. Kananen

(57) ABSTRACT

A shared memory device capable of simplifying wiring to a memory, preventing a decline of performance due to an increase of the area and long wiring, and improving extensibility of scalability of the system is provided: wherein the device has a plurality of memory systems each including a memory macro, a processor, and a memory control unit for controlling an access to a memory macro; wherein the memory control unit of each of the memory systems transfers information between the processor and memory macro and transfers information with a memory control unit of a different memory system; the memory macro of each of the memory systems has a memory interface capable of transferring data; and the memory interfaces of the memory macros of different memory systems are mutually connected.

15 Claims, 18 Drawing Sheets

FIG. 4 READY CHECK BLOCK

SHARED MEMORY DEVICE

CROSS REFERENCES TO RELATED APPLICATIONS

The present invention contains subject matter related to Japanese Patent Application No. 2005-034445 filed in the Japan Patent Office on Feb. 10, 2005, the entire contents of which being incorporated herein by reference.

BACKGROUND OF THE INVENTION

1. Field of the Invention

The present invention relates to a shared memory device, which has a plurality of memory systems including a processor mounted together thereon and shares memories of the systems.

2. Description of the Related Art

When using an architecture focusing on parallel processing in a system having a plurality of memory systems mounted together, the configuration becomes, for example, as shown in FIG. 17.

In the configuration in FIG. 17, logic circuits (processors) 1-1 to 1-4 and memory macros 2-1 to 2-4 are connected one-to-one to give priority to parallel processing.

Here, although the logic circuits 1 and the memory macros 2 are connected one-to-one, each of the logic circuits 1 has to use a path across a higher-level device to refer to data of an adjacent logic circuit.

Therefore, the configuration of directly connecting the logic circuits 1 and adjacent memories by cross bars (X-bars) 3 as shown in FIG. 18 is generally applied.

SUMMARY OF THE INVENTION

As explained above, in the configuration in FIG. 17, the logic circuits 1 and the memory macros 2 are connected one-to-one to give priority to parallel processing, but each of the logic circuits 1 has to use a path across a higher-level device to refer to data of an adjacent logic circuit 1, so that it is hard to make an actual access.

While, in the configuration in FIG. 18, although each of the logic circuits 1 can refer to data of an adjacent logic circuit 1 without using a higher-level device, there are disadvantages that wiring from a logic circuit 1 to a memory 2 becomes very complicated and an increase of the area and long wiring result in a decline of performance.

Furthermore, in the configuration using the cross bars 3 in FIG. 18, extensibility of scalability of the system becomes hard to be improved.

It is desired to provide a shared memory device capable of simplifying wiring to a memory, preventing a decline of performance due to an increase of the area and long wiring, and improving extensibility of scalability of the system.

According to a first aspect of an embodiment of the present invention, there is provided a shared memory device comprising a plurality of memory systems each including a memory macro, a processor, and a memory control unit for controlling an access to a memory macro; wherein the memory control unit of each of the memory systems transfers information between the processor and memory macro and transfers information with a memory control unit of a different memory system; the memory macro of each of the memory systems has a memory interface capable of transferring data; and the memory interfaces of the memory macros of different memory systems are mutually connected.

Preferably, when a command and an address for at least a memory macro of its own memory system is received, the memory control unit decodes the input command, generates access timing of not causing any collision for an access to the memory macro according to the command, and transfers the command and address to the memory macro at the timing.

Preferably, the memory interface receives a command and an address transferred from the processor of the own memory system or/and a memory interface of a memory macro of a different memory system, selects a data path based on a result of determining whether the own memory system has a path corresponding to the input command and address or not, and transfers data relating to an access to the memory macro and memory control unit of the own memory system or a memory interface of a different memory system.

Preferably, an input and output portion not in a relation of connection with other memory macros of memory interfaces in the plurality of memory macros is connected to an external memory.

Preferably, write broadcast is performed via data lines between memory macros when writing data to be accessed to memory macros of one or a plurality of different memory systems.

According to a second aspect of an embodiment of the present invention, there is provided a shared memory device comprising a plurality of memory systems each including a memory macro, a processor, and a memory control unit for controlling an access to a memory macro; wherein the memory control unit of each of the memory systems transfers information between the processor and memory macro and transfers information with a memory control unit of a different memory system; the memory macro of each of the memory systems includes a plurality of ports each having a memory interface capable of transferring data; and corresponding ports of the memory macros of different memory systems are mutually connected.

According to a third aspect of an embodiment of the present invention, there is provided a shared memory device comprising a plurality of memory systems each including a memory macro including a plurality of banks, a processor, and a memory control unit for controlling an access to a memory macro, wherein the memory control unit of each of the memory systems transfers information between the processor and memory macro and transfers information with a memory control unit of a different memory system; each bank of the memory macro of each of the memory systems has a memory interface capable of transferring data; and the memory interfaces of corresponding banks of the memory macros of different memory systems are mutually connected.

BRIEF DESCRIPTION OF DRAWINGS

These and other objects and features of the present invention will become clearer from the following description of the preferred embodiments given with reference to the attached drawings, in which:

FIG. 9 is a view of a connection example between memory macros provided with the memory interface according to the first embodiment of the present invention in;

DESCRIPTION OF THE PREFERRED EMBODIMENT

Below, embodiments of the present invention will be explained with reference to the attached drawings.

First Embodiment

Figure 1:
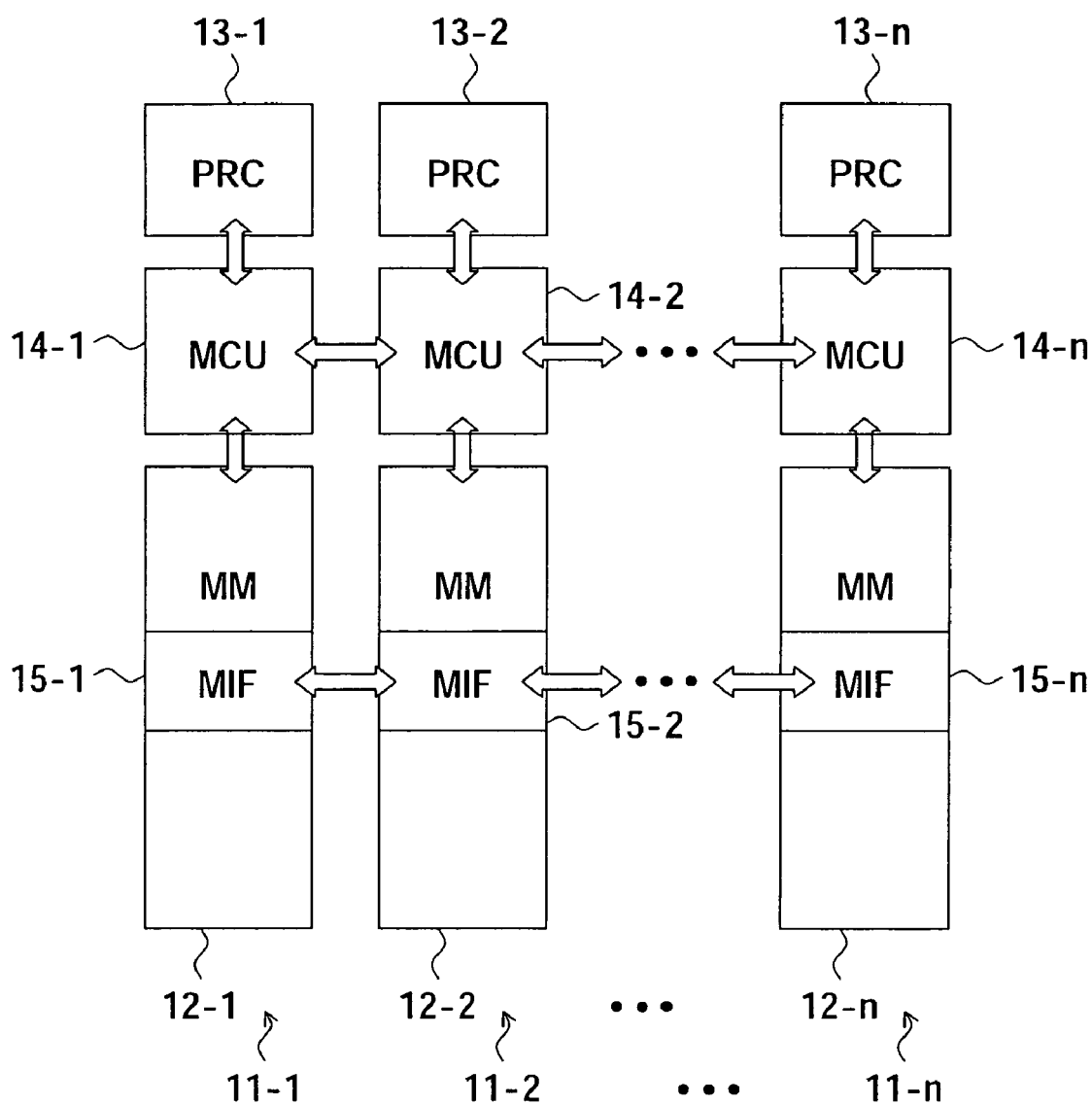
FIG. 1 is a view of a system configuration of a shared memory device according to a first embodiment of the present invention.

FIG. 1 is a view of a system configuration of a shared memory device according to a first embodiment of the present invention.

The shared memory device 10 has a plurality of memory systems 11-1 to 11-n mounted together thereon, wherein accesses can be made between the respective memory systems 11-1 to 11-n and an architecture of a multiprocessor structure focusing on parallel processing is applied.

Each of the memory systems 11-1 to 11-n is basically composed of a memory macro (MM) 12, such as a DRAM and SRAM, for storing data, a processor (PRC) 13 for performing predetermined data processing by accessing to the memory macro 12, and a memory control unit (MCU) 14 for transferring information (data, command, and address) between the processor 13 and memory macro 12 on the own stage and transferring information (only command and address) with memory control units of a different memory systems.

The memory macro 12 in the present embodiment is provided with a memory interface (MIF) 15 capable of transferring data, and memory interfaces of memory macros in different memory systems (adjacent memory systems in the present embodiment) are mutually connected.

Note that FIG. 1 is a conceptual view, and the positions of arranging the memory interfaces 15 in the memory macros 12 become different from those in FIG. 1 when mounting.

Specifically, the memory system 11-1 includes a memory macro 12-1, a processor 13-1, and a memory control unit 14-1.

The memory system 11-2 includes a memory macro 12-2, a processor 13-2, and a memory control unit 14-2.

Similarly, the memory system 11-n includes a memory macro 12-n, a processor 13-n, and a memory control unit 14-n.

The memory interface 15-1 of the memory macro 12-1 of the memory system 11-1 is connected to the memory interface 15-2 of the memory macro 12-2 of the adjacent memory system 11-2.

The memory interface 15-2 of the memory macro 12-2 of the memory system 11-2 is connected to the memory interface (15-3) of the memory macro (12-3) of a not shown adjacent memory system (11-3).

In the same way, the memory interface 15-n of the memory system 11-n is connected to a memory interface (15-n-1) of the memory macro (12-n-1) of a not shown adjacent memory system (11-n-1).

As explained above, the shared memory device 10 of the first embodiment is configured that a memory macro of each memory system is provided with a memory interface capable of transferring data and data can be transferred between memory macros. Also, in the present embodiment, it is configured to perform write broadcast via data lines between memory macros when writing data to be accessed to memory macros of one or a plurality of different memory systems.

Below, specific configurations and functions of the memory control units 14-1 to 14-n and memory interfaces 15-1 to 15-n of the memory macros 12-1 to 12-n will be explained.

First, a memory control unit 14 of each memory system will be explained. Note that all memory control units in the respective memory systems have the same configuration.

Figure 2:
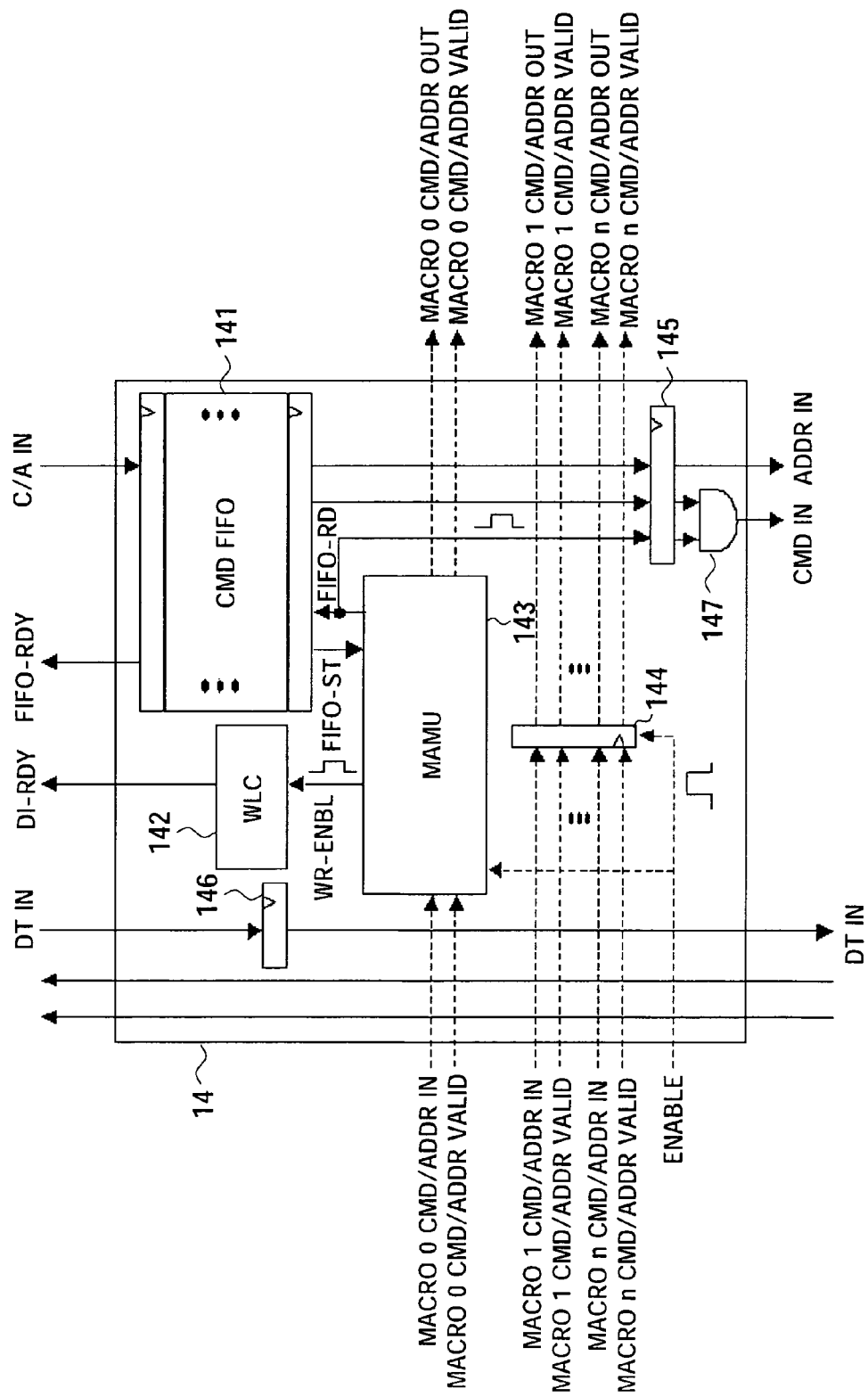
FIG. 2 is a view of a configuration of an example of a memory control unit according to the present embodiment.

FIG. 2 is a view of a configuration of an example of the memory control unit according to the present embodiment.

The memory control unit 14 in FIG. 2 has a command FIFO (first-in first-out: CMD FIFO) 141, a write latency counter (WLC) 142, a memory access management unit (MAMU) 143, latches 144 to 146, and an AND gate 147.

The command FIFO 141 stores a command and address issued by the processor 13 on the own memory system 11, receives a FIFO read signal FIFO-RD from the MAMU 143, and outputs the stored command and address (C/A or CMD/ADDR) to the latch 145.

Also, the command FIFO 141 outputs a FIFO ready signal "FIFO-RDY" to the processor 13 when in a ready state and outputs a FIFO state signal "FIFO-ST" indicating a current state to the MAMU 143.

The write latency counter 142, when a write command to the memory macro 12 of its own system is issued, receives a write enable signal "WR-ENBL" from the MAMU 143 and counts a predetermined number in consideration of a latency of writing and outputs a data-in-ready signal "DI-RDY" indicating that data input is in a ready state to the processor 13.

When receiving the data-in-ready signal "DI-RDY", the processor 13 issues write data, and the write data (Data In: DT IN) is temporarily latched by the latch 146 and supplied to the memory macro 12.

The MAMU 143, when receiving a command, address (CMD/ADDR) and a valid signal LD thereof for the memory macro 12 of its own system 11, decodes the input command, generates access timing of not causing any collision in an access to the memory macro 12 according to write and read operations, etc. in accordance with the command, and outputs a FIFO read signal FIFO-RD to the command FIFO 141 and the latch 145, so that the command and address are transferred to the memory macro 12 at the timing.

When the command determined to be valid is a write command, the MAMU 143 outputs a write enable signal WR-ENBL to the write latency counter 142.

Figure 3:
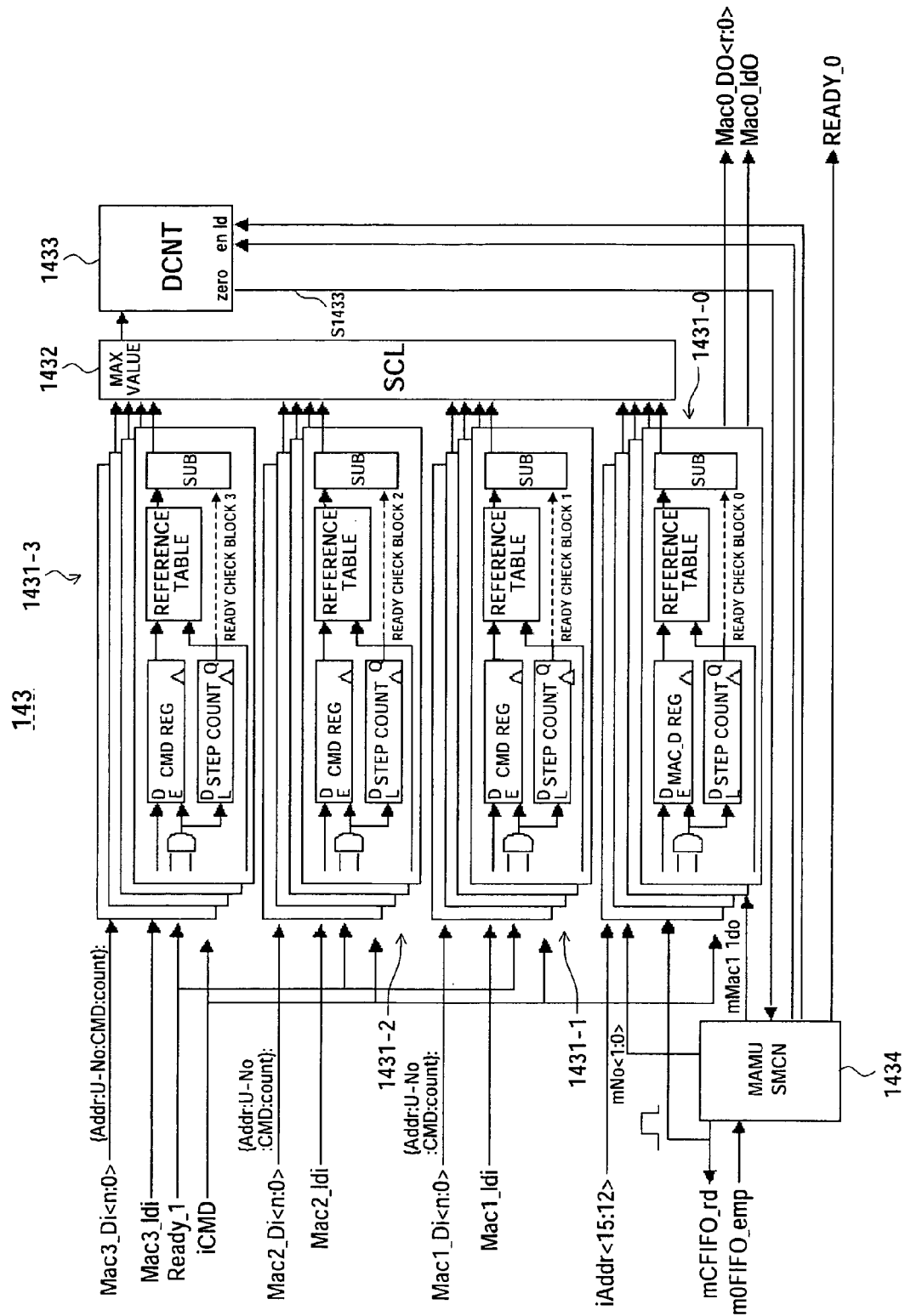
FIG. 3 is a view of a configuration example of a memory access management unit (MAMU) in the memory control unit according to the present embodiment.

FIG. 3 is a view of a configuration view of the MAMU (memory access management unit) in the memory control unit according to the present embodiment.

Figure 4:
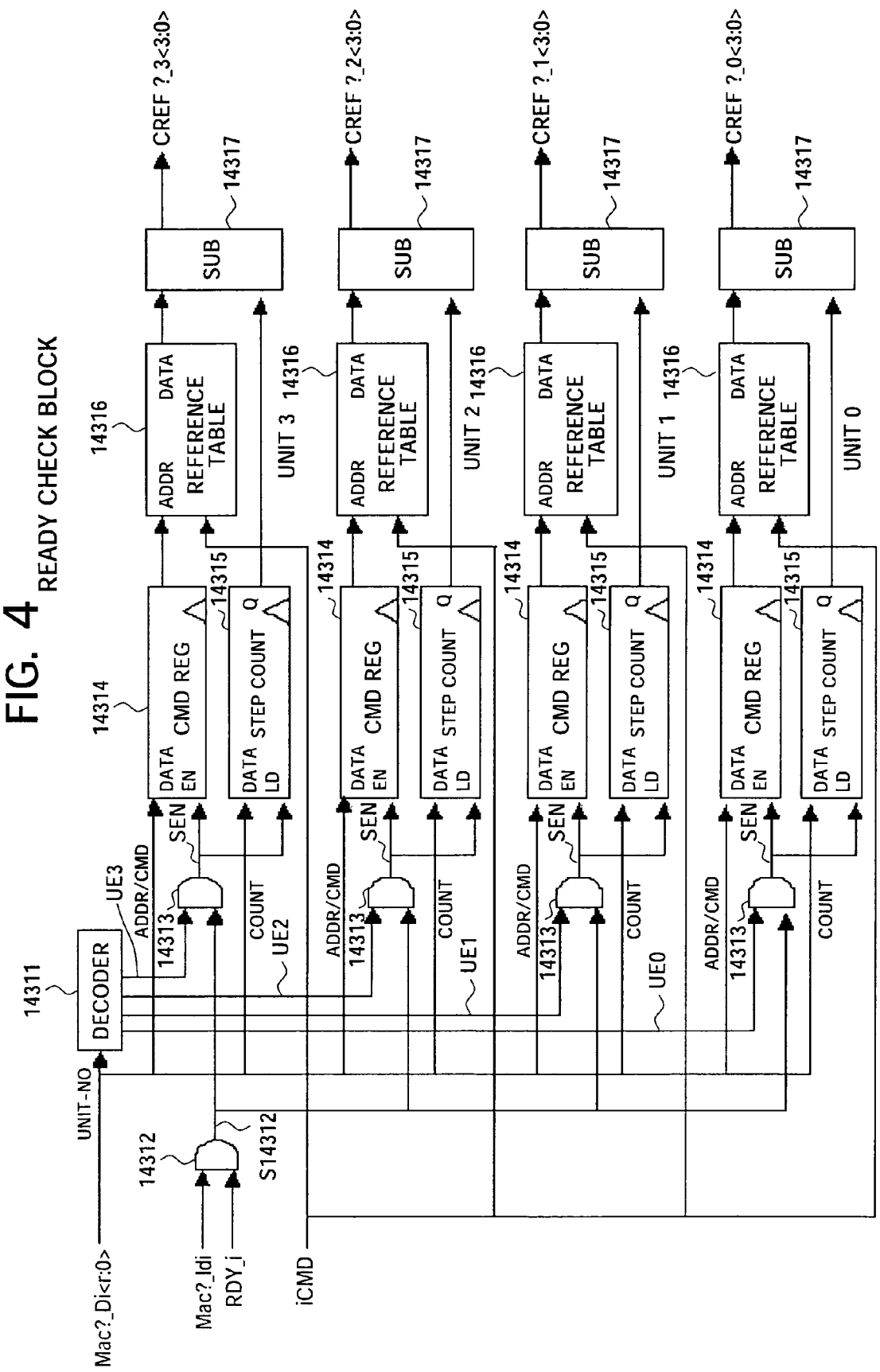
FIG. 4 is a view of a configuration example of a ready check block (RCB) in FIG. 3.

FIG. 4 is a view of a configuration example of a ready check block in FIG. 3.

The MAMU 143 basically includes, as shown in FIG. 3, ready check blocks (RCB) 1431-0 to 1431-3 corresponding to the number "n" of the memory systems (n=4 in FIG. 3), a selector 1432, a down counter (DCNT) 1433, and a MAMU state machine (SMCN) 1434.

As shown in FIG. 3 and FIG. 4, each of the RCB 1431-0 to 1431-3 has units UNT0 to UNT3 corresponding to the number (4 in the example in FIG. 3 and FIG. 4) of commands and addresses (CMD/ADDR) accessing to the memory macro 12 of the own memory system, a decoder 14311, and an AND gate 14312.

The RCBs 1431-0 to 1431-3 are provided corresponding to memory macros 12-1 to 12-n (n=4 in the present embodiment) of the respective memory systems 11-1 to 11-n and, as shown in FIG. 4, their corresponding macro data (a unit number "Unit-No.", address and command "ADDR/CMD") "Mac?_Di" (=3, 2, 1 and 0), a macro valid signal "Mac?_ldi", a ready signal "RDYi" and command "iCMD" in execution are supplied.

On receiving the macro data "Mac?_Di", the decoder 14311 decodes the unit number and outputs, for example, a high level unit enable signal UE0 to UE3 to a corresponding unit "UNT" based on the decoding result.

The AND gate 14312 obtains an AND of the macro valid signal "Mac?_ldi" and the ready signal "RDYi" and, when both of the input signals are at a high level, outputs a high level signal S14312 to the respective units UNT0 to UNT3.

Each of the units UNT0 to UNT3 has the same configuration and include of an AND gate 14313, a command register (CMDreg) 14314, a step counter (STEPcount) 14315, a reference table 14316, and a subtractor (Sub) 14317.

The AND gate 14313 obtains AND of the output signal S14312 of the AND gate 14312 and the unit enable signal UE0 to UE3 from the decoder 14311 and, when both of the signals are at a high level, outputs a enable signal SEN at the high level to the command register 14314 and the step counter 14315.

On receiving the enable signal SEN at the high level from the AND gate 14313 at an enable terminal EN, the command register 14314 becomes an enable state, retrieves and holds an address and command information (ADDR/CMD) of the macro data "Mac?_Di" supplied to a data terminal "Data", and outputs the held data to the reference table 14316.

On receiving the enable signal at the high level from the AND gate 14313 at a load terminal LD, the step register 14315 becomes an enable state, retrieves and holds the macro data "Mac?_Di" supplied to the data terminal "Data", counts the number of steps of the command, and outputs the result to the subtractor 14317.

The reference table 14316 receives as an input the held data by the command register 14314 and the command "iCMD" in execution, schedules so that after how many clocks the next command should be issued by obtaining a difference of clocks between a currently executed command and a command to be issued next, and outputs to the subtractor 14317 issuance timing as the result.

The subtractor 14317 receives as an input the issuance timing and command "iCMD" from the reference table, obtains a difference of the issuance time and execution time of the command (and address) in execution, and outputs the result to the selector 1432 in FIG. 3.

The selector 1432 in FIG. 3 selects a maximum value among output values of the subtractors 14317 of the plurality of (4 in the present embodiment) units UNT of the RCB 1431-0 to 1431-3 and outputs the same to the down counter 1433.

The down counter 1433 is controlled to be in an enable state by the state machine 1434, loads an output of the selector 1432 by the load signal to the load terminal ld, counts down to zero and, when reaches zero, outputs the fact as a signal S1433 to the state machine 1434.

The state machine 1434 manages a state of the MAMU 143 and, when receiving the signal S1433 from the down counter 1433, outputs a ready signal "RDY_i (the ready signal "RDY_0" of the memory system 11-1 in the example in FIG. 3) of the own memory system 11, and outputs a FIFO read signal "FIFO-RD" to the command FIFO 141.

Note that, in the example in FIG. 3, the MAMU of the memory system 11-1 is assumed and, in this case, macro data "Mac0_D" and a macro valid signal "Mac0_ld0" are output from the RCB 1431-0.

Here, outline of operations of the MAMU 143 configured as above and the RCB 1431 will be explained with reference to FIG. 5 and FIG. 6.

Figure 5:
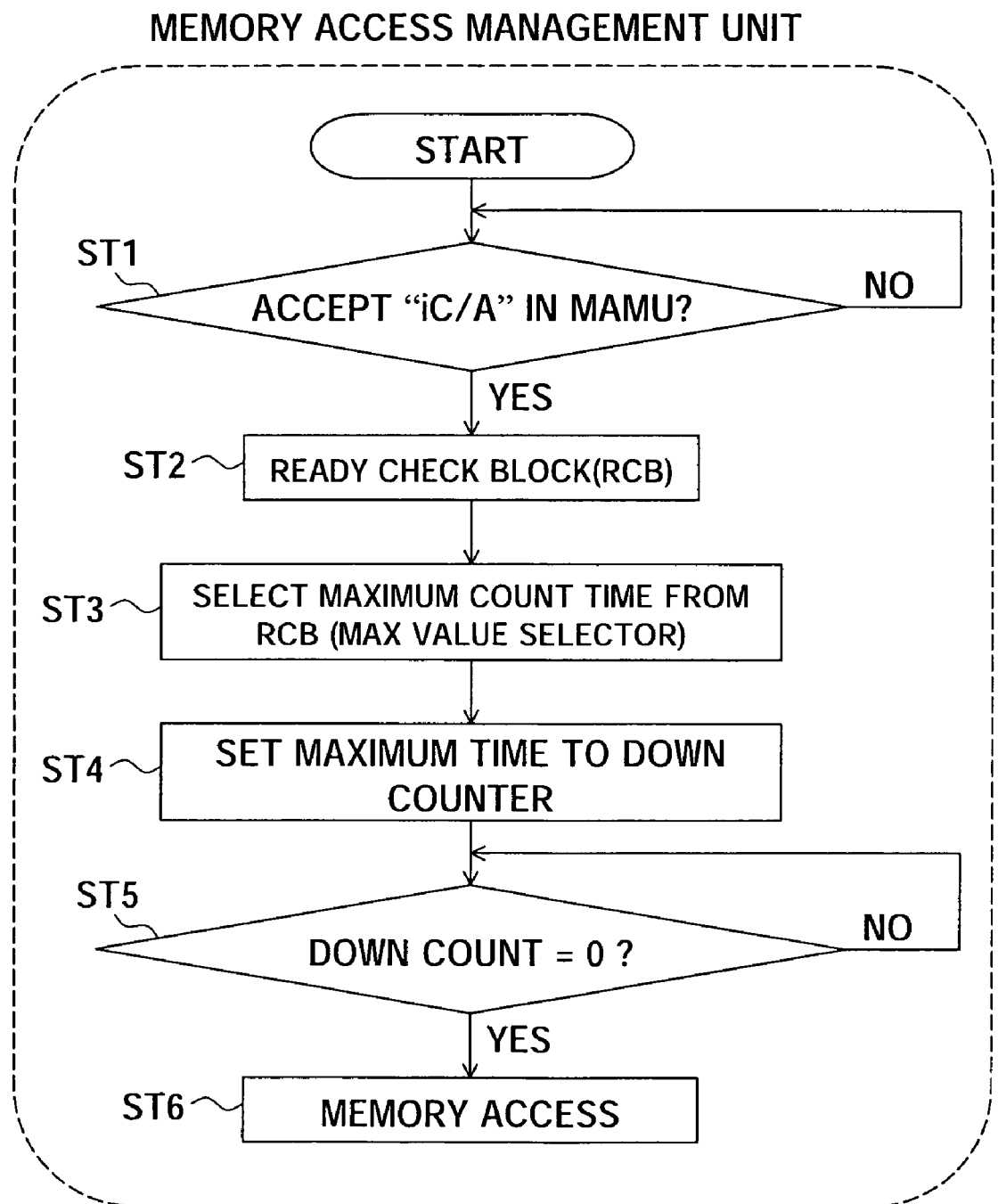
FIG. 5 is a flowchart for explaining an operation of the MAMU in the present embodiment.
Figure 6:
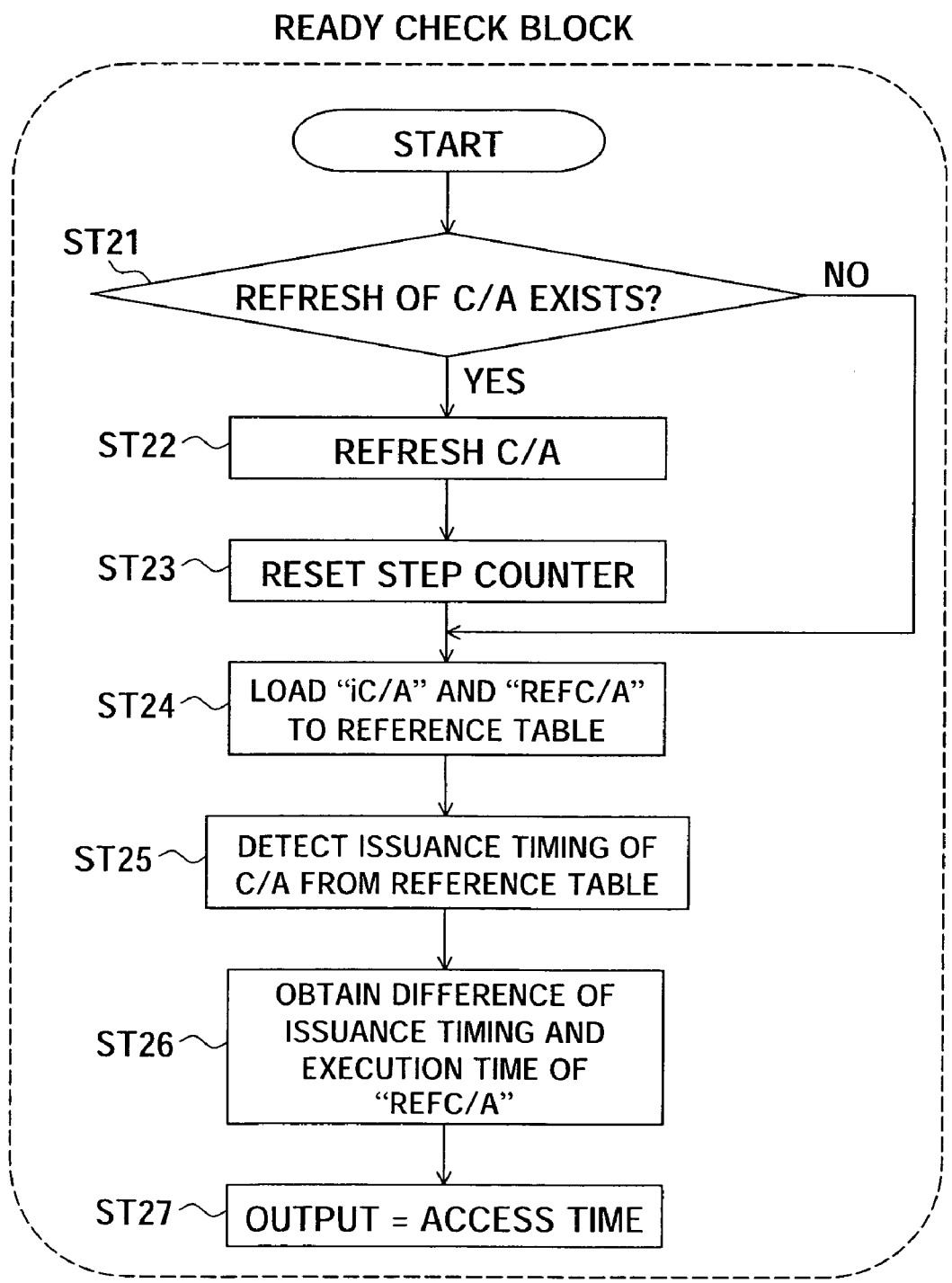
FIG. 6 is a flowchart for explaining an operation of the RCB in the present embodiment.

FIG. 5 is a flowchart for explaining an operation of the MAMU in the present embodiment, and FIG. 6 is a flowchart for explaining an operation of the RCB in the present embodiment.

In the MAMU 143, first, it is determined whether or not to receive as an input a command/address (iC/A) issued by the processor 13 (ST1).

When receiving the command/address (iC/A) in the step ST1, the procedure proceeds to processing in the RCB 1431 (ST2).

In the RCB 1431, first, it is determined whether refreshing of the command/address (iC/A) is required or not at a step ST21.

At the step ST21, when it is determined that refreshing is required, the command/address (C/A) is refreshed (ST22), the step counter 14315 is reset (ST23) and the procedure proceeds to processing at a step ST24.

While when it is determined that refreshing is not required at the step ST21, the procedure proceeds directly to processing at a step ST24 by skipping the processing at the steps ST22 and ST23.

At the step ST24, the command/address (iC/A) issued by the processor 13 and a command/address (refC/A) in execution are loaded to the reference table 14316.

Then, issuance timing of the command/address (C/A) is detected by the reference table 14316 (ST25).

Next, in the subtractor 14317, a difference of the issuance timing and execution time of the command/address (refC/A) in execution is obtained (ST26). This processing is for obtaining access time of the memory macro 12. The access time is input to the selector 1432 (ST27).

In the selector 1432 of the MAMU 143, maximum counting time is selected from outputs of the RCB 1431 (ST3).

Then, the selected maximum access time is set to the down counter 1433 (ST4).

The down counter 1433 counts down until the count value becomes zero (0) and, when reaches zero (ST5), outputs in the state machine 1434 a ready signal "RDY_i" of the own memory system 11 and outputs a FIFO read signal "FIFO-RD" to the command FIFO 141 so as to make an access to the memory macro 12 (ST6).

Next, the specific configuration and function of the memory interfaces 15-1 to 15-n of the memory macros 12-1 to 12-n will be explained.

Figure 7:
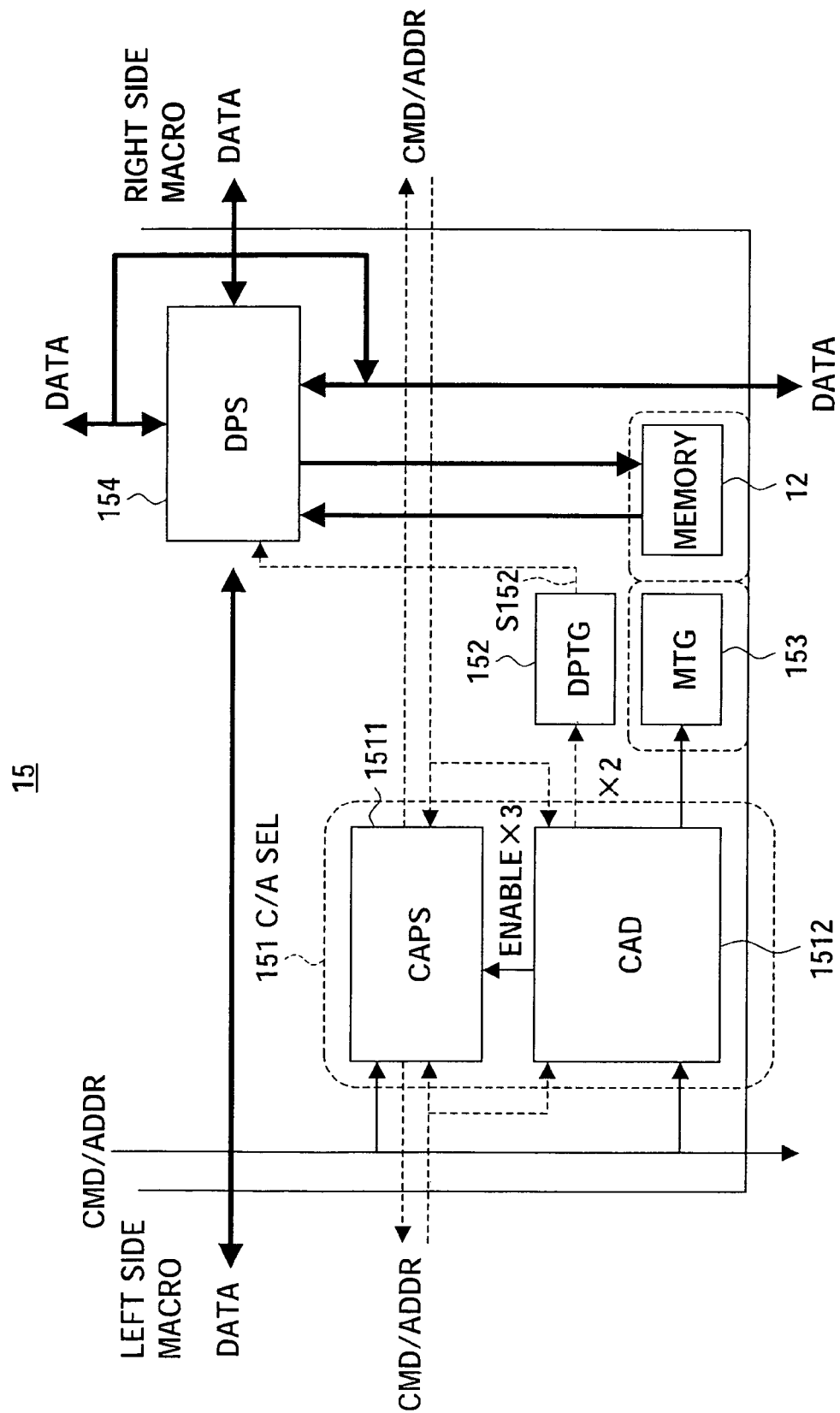
FIG. 7 is a view of a configuration example of a memory interface according to the present embodiment.

FIG. 7 is a view of a configuration example of the memory interface according to the present embodiment.

The memory interface 15 in FIG. 7 includes a command/address selector (C/A SEL) 151, a data path timing generator (DPTG) 152, a memory timing generator (MTG) 153, and a data path selector (DPS) 154.

The command/address selector 151 includes, as shown in FIG. 7, a command/address path selector (CAPS) 1511 and a command/address decoder (CAD) 1512.

The command/address path selector 1511 determines an output direction of the command and address transferred from the processor 13 of the own memory system 11 and a memory interface 15 of a memory macro 12 of a memory system arranged on the left or/and right based on an enable signal from the command address decoder 1512, and transfers to a memory interface 15 of the memory system arranged on the right or left side.

The command/address decoder 1512 receives a command and address transferred from the processor 13 of the own memory system 11 and a memory interface 15 of a memory macro 12 of a memory system arranged on the left or/and right, determines whether the own memory system 11 has a path corresponding to the input command and address or not, and notifies the data path timing generator 152 and the memory timing generator 153 of the result.

When being notified that there is a path corresponding to the input command and address from the command/address decoder 1512, the data path timing generator 152 selects a path for transferring the data transferred from the processor 13 of the own memory system 11 and a memory interface 15 of a memory macro 12 of a memory system arranged on the adjacent right or/and left to the processor 13 or a memory interface 15 of a memory macro 12 of the memory system 11 arranged on the left or right side, generates a signal S152 for controlling timing of passing, and outputs the signal S152 to the data path selector 154.

When being notified that there is a path corresponding to the input command and address from the command/address decoder 1512, the memory timing generator 153 generates a signal S153 for controlling timing of making an access to the memory macro 12 of the own memory system 11, and supplies the same to the memory macro 12.

The data path selector 154 receives a signal S152 from the data path timing generator 152, and selectively transfers data transferred from the processor 13 of the own memory system 11 and a memory interface 15 of a memory macro 12 of the memory system arranged on the adjacent right or/and left to the memory macro 12 of the own memory system 12, or a processor 13, or a memory interface 15 of a memory macro 12 of a memory system 11 arranged on the left or right side.

Figure 8:
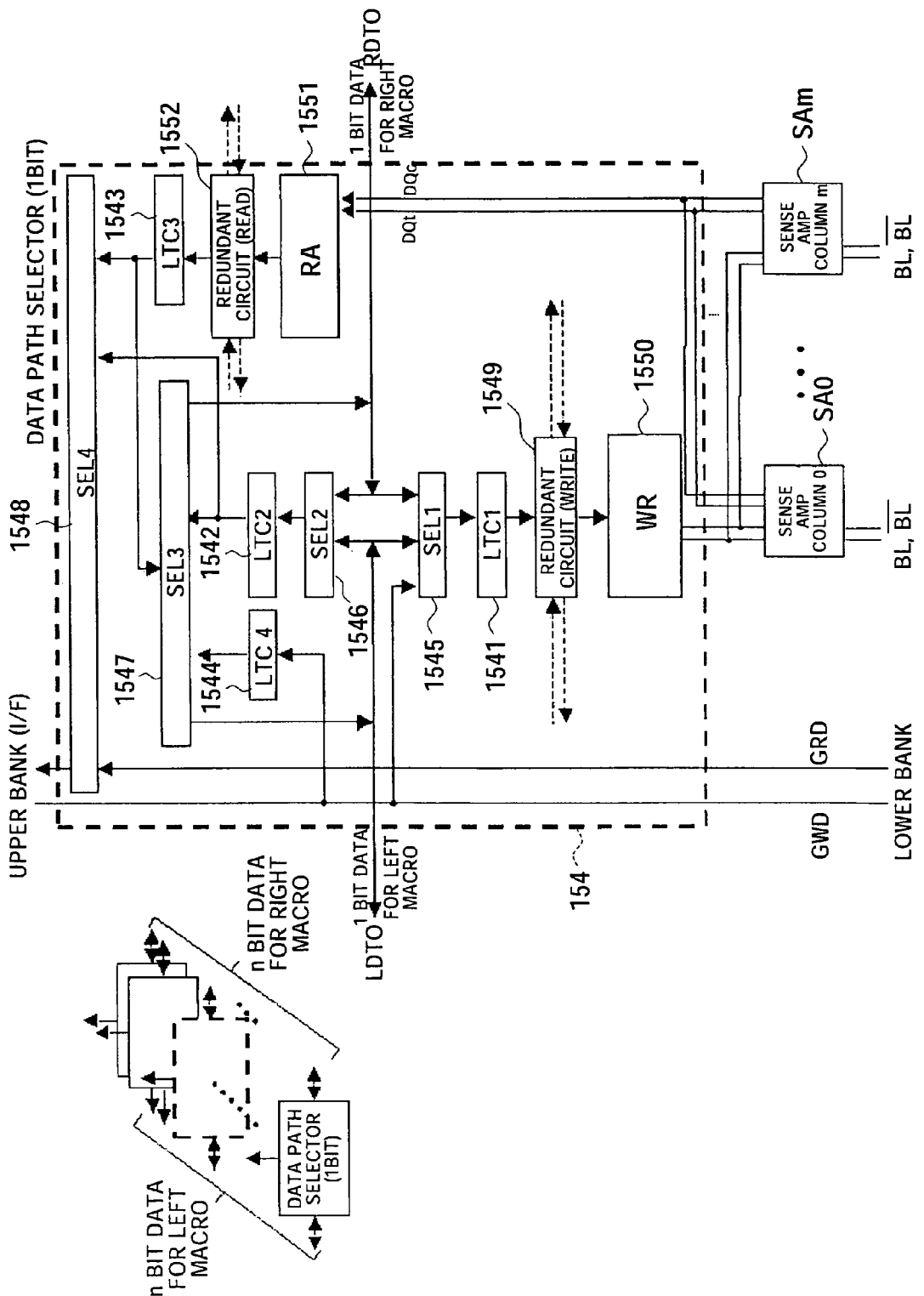
FIG. 8 is a circuit diagram of a specific configuration example of a data path selector in the present embodiment.

FIG. 8 is a circuit diagram of a specific configuration example of the data path selector in the present embodiment.

The data path selector 154 in FIG. 8 includes a first latch (LTC1) 1541, a second latch (LTC2) 1542, a third latch (LTC3) 1543, a fourth latch (LTC4) 1544, a first selector (SEL1) 1545, a second selector (SEL2) 1546, a third selector (SEL3) 1547, a fourth selector (SEL4) 1548, a write redundant circuit 1549, a write buffer (WR) 1550, a read amplifier (RA) 1551, and a read redundant circuit 1552.

The data path selector 154 in FIG. 8 is a circuit in an amount of one bit and, for example, the same circuits are provided by the number of 256 when dealing with 256 bits.

Note that, in FIG. 8, a memory portion of the memory macro 12 is assumed to be a DRAM, and SA0 to SAm indicates the sense amplifiers. Also, BL indicates a bit line.

In the data path selector 154, data and paths selected by the first to fourth selectors 1545 to 1548 are controlled by a control signal S152 by the data path timing generator 152.

The first selector 1545 is supplied with global write data GWD issued by the processor 13 of the own memory system 11 and through the memory control unit 14, data LDTI transferred from a memory interface of a memory macro of a memory system arranged on the left side, and data RDTI transferred from a memory interface of a memory macro of a memory system arranged on the right side, selects data in accordance with an instruction of the control signal S152 and outputs to the first latch 1541.

Write data latched by the first latch 1541 is supplied to the write buffer 1550 via the redundant circuit 1549 and transferred to the sense amplifiers SA0 to SAm, so that the data is written in a memory cell at a specified address.

The second selector 1546 is supplied with data LDTI transferred from a memory interface of a memory macro of a memory system arranged on the left side and data RDTI transferred from a memory interface of a memory macro of a memory system arranged on the right side, selects one of the data based on an instruction by the control signal S152 and outputs to the second latch 1542.

The data LTDI or RTDI latched by the second latch 1542 is supplied to the third selector 1547 and fourth selector 1548.

The third latch 1543 latches read data read from the memory portion of the memory macro of the own memory system 11 and supplied via the read amplifier 1551 and the redundant circuit 1552. The data latched by the third latch 1543 is supplied to the third selector 1547 and the fourth selector 1548.

The fourth latch 1544 latches global write data GWD issued by the processor 13 of the own memory system 11 and supplied via the memory control unit 14. The data latched by the fourth latch 1544 is supplied to the third selector 1547.

The third selector 1547 selects one of global write data GWD issued by the own memory system 11, read data read from the memory portion of the own memory system, data LDTI transferred from a memory interface of a memory macro of a memory system arranged on the left side and data RDTI transferred from a memory interface of a memory macro of a memory system arranged on the right side as data LTDO to the memory interface of the memory macro of the memory system on the left side or as data RTDO to the memory interface of the memory macro of the memory system on the right side, and transfers the selected data to the memory interface on the left side or that on the right side.

The fourth selector 1548 selects one of global read data GRD from a later explained lower level bank, read data read from the memory portion of the own memory system, data LDTI transferred from a memory interface of a memory macro of a memory system arranged on the left side, and data RDTI transferred from a memory interface of a memory macro of a memory system arranged on the right side, and transfers the selected data to the processor 13 via the memory control unit 14 of the own memory system 11.

Figure 9:
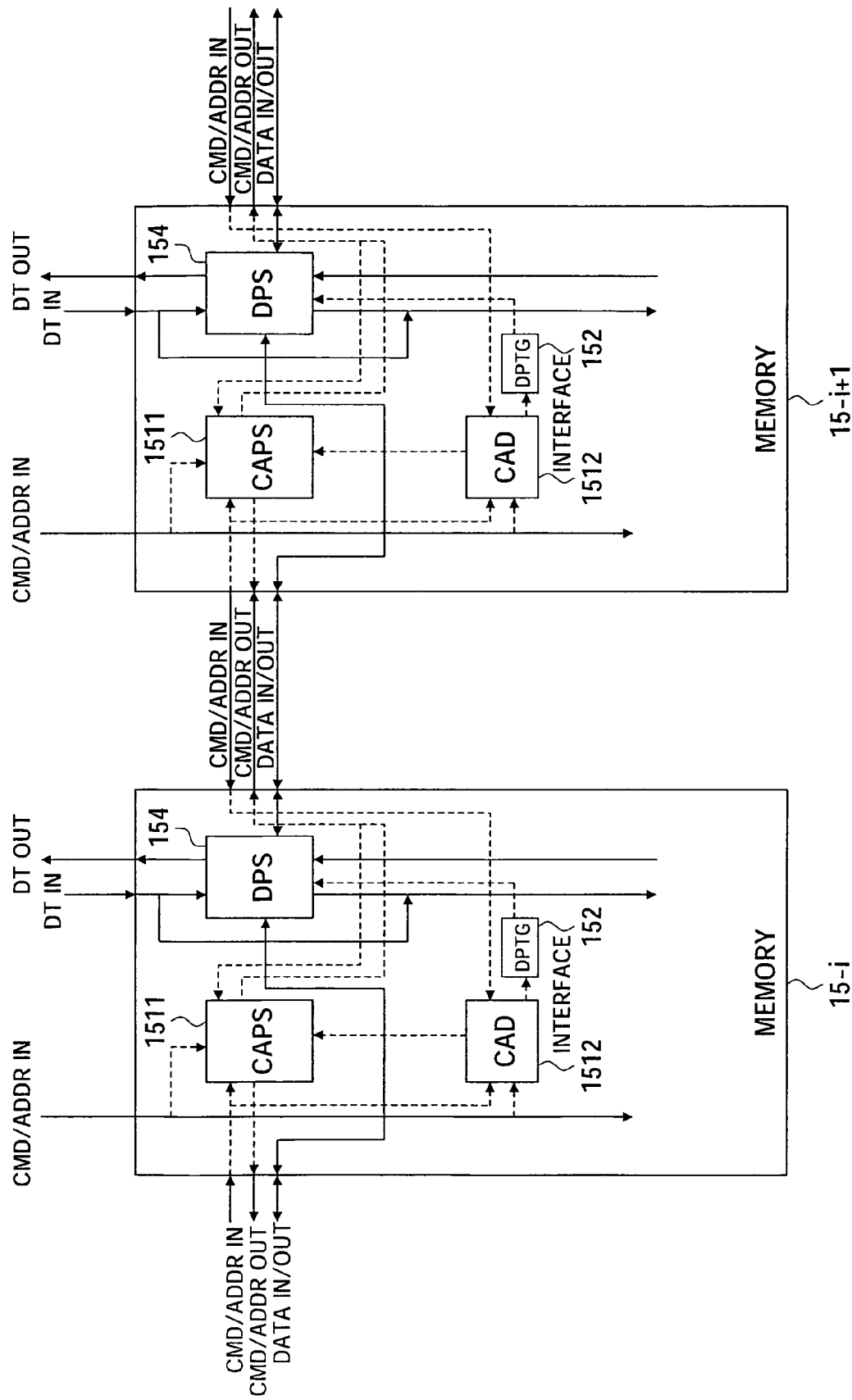

FIG. 9 is a view of an example of connection between memory macros provided with a memory interface 15 having the above configuration.

The example in FIG. 9 shows the case where the memory timing generator 153 is arranged at the memory portion of the memory macro 12, so that it is not illustrated in the memory interfaces 15-*i* and 15-*i*+1.

Next, an operation of the shared memory device 10 having the configuration in FIG. 1 will be explained.

First, for example, the case where the processor 13-1 of the memory system 11-1 accesses to a memory cell of the desired address of the memory macro 12-1 of the own system will be explained.

In this case, write or read command and an address to be accessed are issued in the processor 13-1 and output to the memory control unit 14-1.

In the memory control unit 14-1, an input command is decoded based on a command and address (CMD/ADR) and a valid signal LD thereof to the memory macro 12-1 of the own memory system 11-1 issued by the processor 13-1, and access timing of not causing any collision is generated for an access to a memory macro 12 according to write and read operations, etc. in accordance with the command. Transfer of the command and address is controlled to be performed at the timing generated by the memory control unit 14-1, and the command and address are output to the memory interface 15-1 of the memory macro 12-1.

Note that, in the memory control unit 14-1, when the command is any of a write command or read command, write data issued by the processor 13-1 or read data read from the memory macro 12-1 or supplied through the memory macro 12-1 is propagated to the memory macro 12-1 or the processor 13-1 basically in a way of passing through it.

In the memory interface 15-1, based on the command and address transferred from the memory control unit 14-1, whether or not the own memory system 11-1 has a path corresponding to the input command and address is determined. In this case, it is determined that the own memory system 11-1 has the path.

In the memory interface 15-1, based on the determined result, write data issued by the processor 13-1 of the own memory system 11-1 is transferred to the memory portion of the memory macro 12-1, and the data is written in a memory cell at a desired address.

Alternately, read data read from the memory macro 12-1 of the own memory system 11-1 is transferred to the processor 13-1 via the memory control unit 14-1.

Next, for example, the case where the processor 13-1 of the memory system 11-1 accesses to a memory cell at a desired address of the memory macro 12-2 of the adjacent memory system 11-2 on the right side will be explained.

In this case, in the processor 13-1, a write or read command and an address to be accessed are issued and output to the memory control unit 14-1.

In the memory control unit 14-1, because the command and address are not for the memory macro 12-1 of the own memory system 11-1, the command and address issued by the processor 13-1 are transferred to the memory control unit 14-2 of the adjacent memory system 11-2.

In the memory control unit 14-2, based on the command and address (CMD/ADR) and the valid signal LD for the memory macro 12-2 of the own memory system 11-2 issued by the processor 13-1, the input command is decoded and access timing of not causing any collision is generated for an access to the memory macro 12 according to write and read operation, etc. in accordance with the command. Then, transfer of the command and address to the memory macro 12-2 is controlled to be performed at the timing generated by the memory control unit 14-2, and the command and address are output to the memory interface 15-2 of the memory macro 12-2.

Note that, in the memory control unit 14-1, when the command is any of a write command or read command, write data issued by the processor 13-1 or read data read from the memory macro 12-2 or supplied through the memory macro 12-1 is propagated to the memory macro 12-1 or the processor 13-1 basically in a way of passing through it.

In the memory interface 15-1, based on the command and address transferred from the memory control unit 14-1, whether or not the own memory system 11-1 has a path corresponding to the input command and address is determined. In this case, it is determined that the own memory system 11-1 does not have the path.

As a result, in the memory interface 15-1, based on the determined result, write data issued by the processor 13-1 of the own memory system 11-1 is transferred to the memory interface 15-2 of the memory macro 12-2 of the memory system 11-2 on the right side.

Alternately, read data read from the memory macro 12-2 of the own memory system 11-2 and transferred from the memory interface 15-2 is transferred to the processor 13-1 via the memory control unit 14-1.

In the memory interface 15-2, based on the command and address transferred from the memory control unit 14-2, whether or not the own memory system 11-2 has a path corresponding to the input command and address is determined. In this case, it is determined that the own memory system 11-2 has the path.

Also, in the memory interface 15-2, based on the determined result, write data issued by the processor 13-1 of the adjacent memory system 11-1 and input to the memory interface 15-2 via the memory interface 15-1 is transferred to the memory portion of the memory macro 12-2, and the data is written in a memory cell at a desired address.

Alternately, read data read from the memory macro 12-2 of the memory system 11-2 is transferred to the memory interface 15-1 of the adjacent memory system 11-1 via the memory interface 15-2 and transferred to the processor 13-1 via the memory control unit 14-1.

As explained above, according to the first embodiment, each of the memory system 11-1 to 11-n includes a memory macro 12, such as a DRAM and SRAM, for storing data, a processor 13 for performing predetermined data processing by accessing to the memory macro 12, and a memory control unit 14 for transferring information (data, command, and address) between the processor 13 and memory macro 12 on the own stage and transferring information (only command and address) with memory control units of a different memory systems; the memory macro 12 is provided with a memory interface 15 capable of transferring data; and memory interfaces of memory macros of different memory systems (adjacent memory systems in the present embodiment) are mutually connected; so wiring to the memory can be simplified, a decline of performance due to an increase of the area and long wiring can be prevented, and extensibility of scalability of the system can be improved.

Further, as in the first embodiment, in a system of a multi-processor structure, it is possible to mount processors by the number suitable to processing capability required by an application by incorporating optimized memory systems in pairs in the processor so as to secure the extensibility. Alternately, when the mountable number of processors increases due to development of the semiconductor process, it becomes possible to expect an improvement of the processing performance without changing the architecture. At this time, it is preferable that a memory system hierarchical structure is applied to reduce accessing time to the memory system.

Further, according to the first embodiment, when writing data to be accessed to memory macros of one or a plurality of different memory systems, write broadcast is performed via data lines between the memory macros, so that the effects below can be also obtained.

Namely, in the system of the multiprocessor structure, when a plurality of processors refer to certain data in a general memory system, an access has to be made to the same data for many times by using a system bus.

On the other hand, in the first embodiment, in the memory system, data can be copied to a plurality of memory macros by write broadcast through data lines between memory macros. Consequently, a processor can make an access to the closest local macro for the data. As a result, unnecessary data transfer can be reduced, a load on the system bus can be also reduced, and the processing performance can be improved.

Second Embodiment

Figure 10:
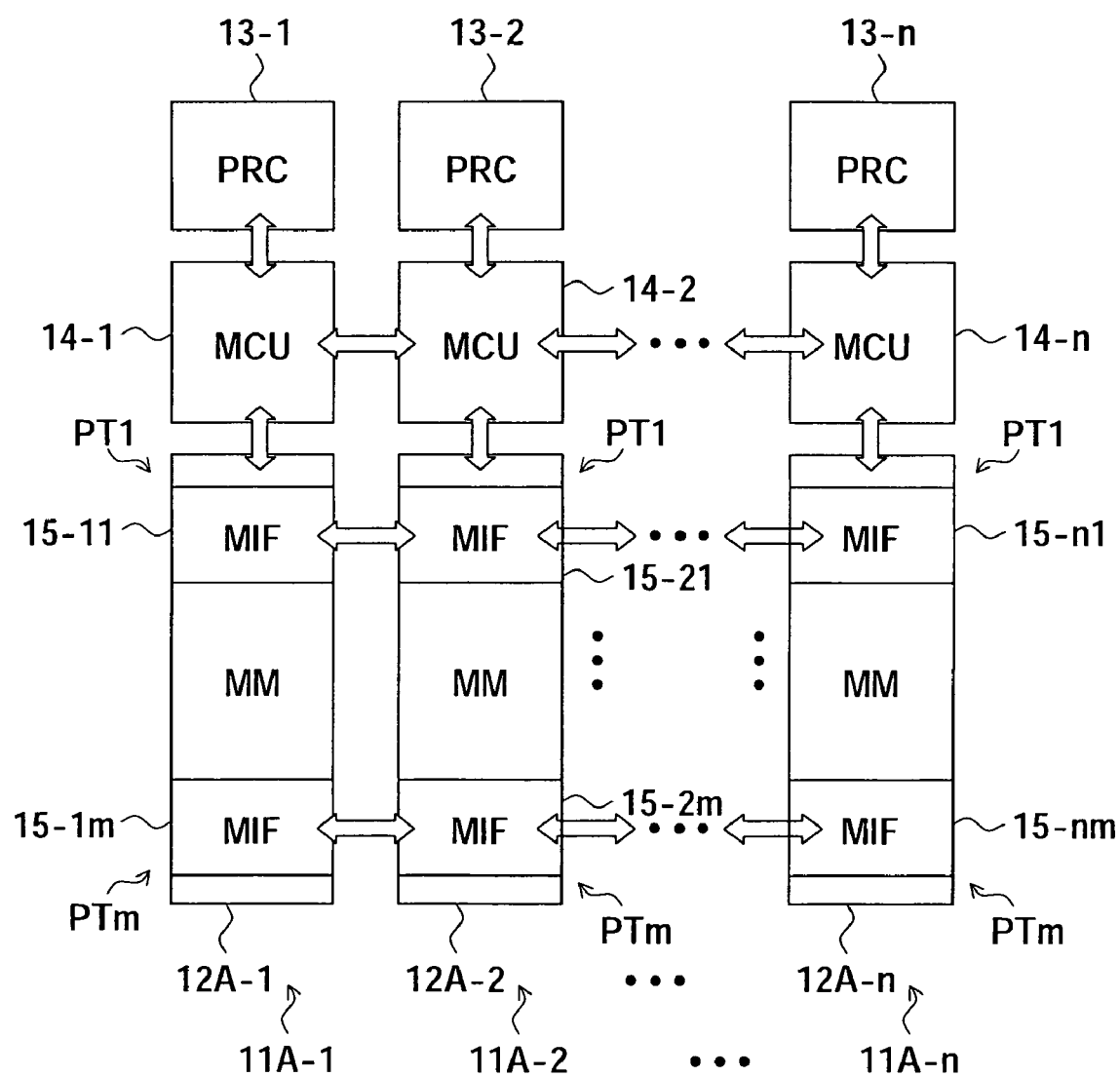
FIG. 10 is a view of a system configuration of a shared memory device according to a second embodiment of the present invention.

FIG. 10 is a view of a system configuration of a shared memory device according to a second embodiment of the present invention.

Figure 11:
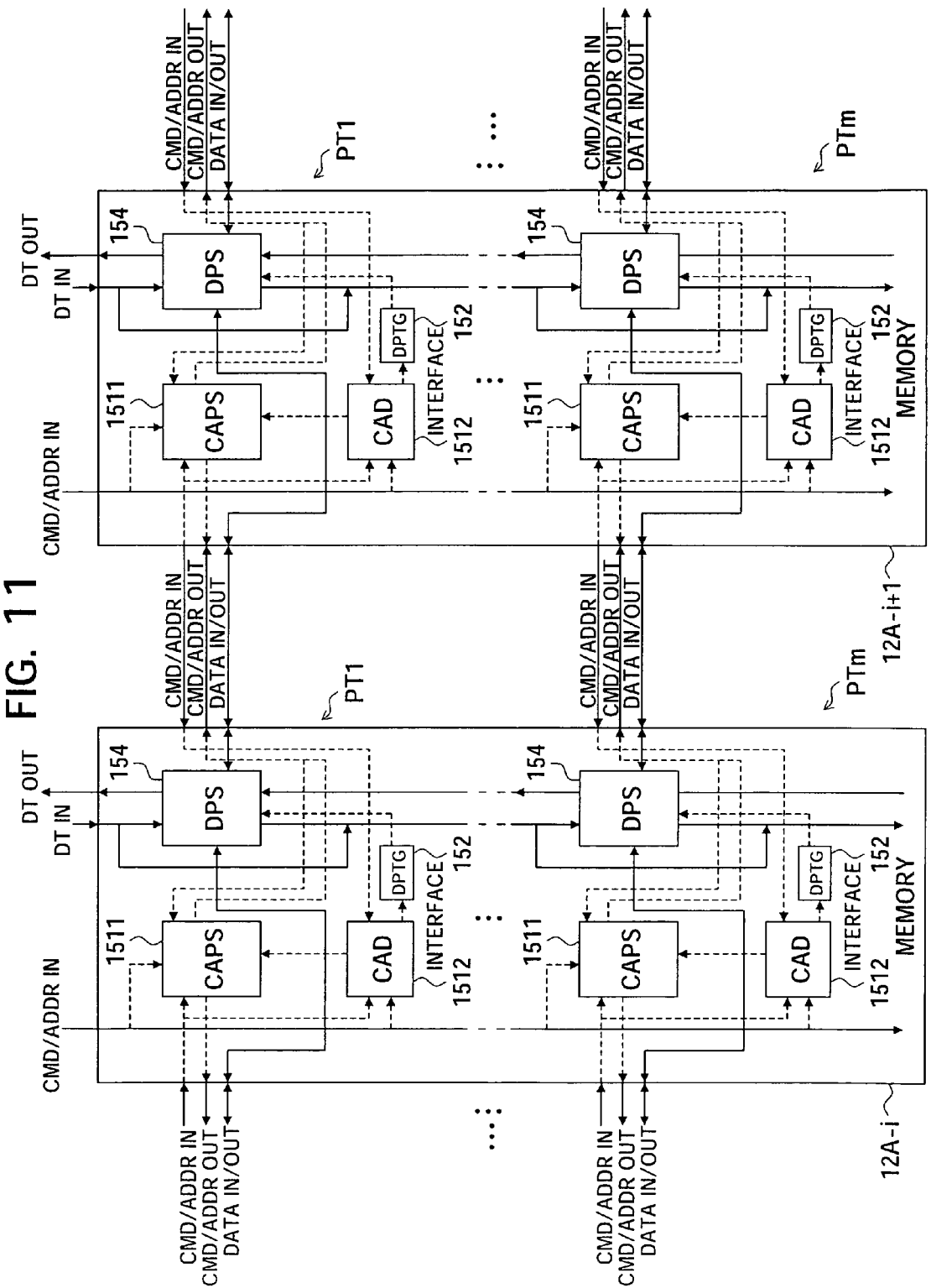
FIG. 11 is a connection example between memory macros provided with a memory interface according to the present invention in the second embodiment.

FIG. 11 is a view of an example of connection between memory macros each provided with the memory interface according to the present embodiment.

A point that the second embodiment is different from the first embodiment is that each of the memory macros 12A-1 to 12A-n has a plurality of ports PT capable of performing data transfer with different memory macros.

In this case, the memory interface 15 is arranged to be corresponding to the respective ports, and the basic configuration is the same as that explained with reference to FIG. 7 and FIG. 8. Accordingly, the detailed explanation will be omitted.

The second embodiment shows the case where the memory timing generator 153 is arranged in a memory portion of the memory macro 12A, so that it is not illustrated in the respective memory interfaces 15 in FIG. 11.

Other configuration is the same as that in the first embodiment and, according to the second embodiment, the same effects as those in the first embodiment explained above can be obtained.

Third Embodiment

Figure 12:
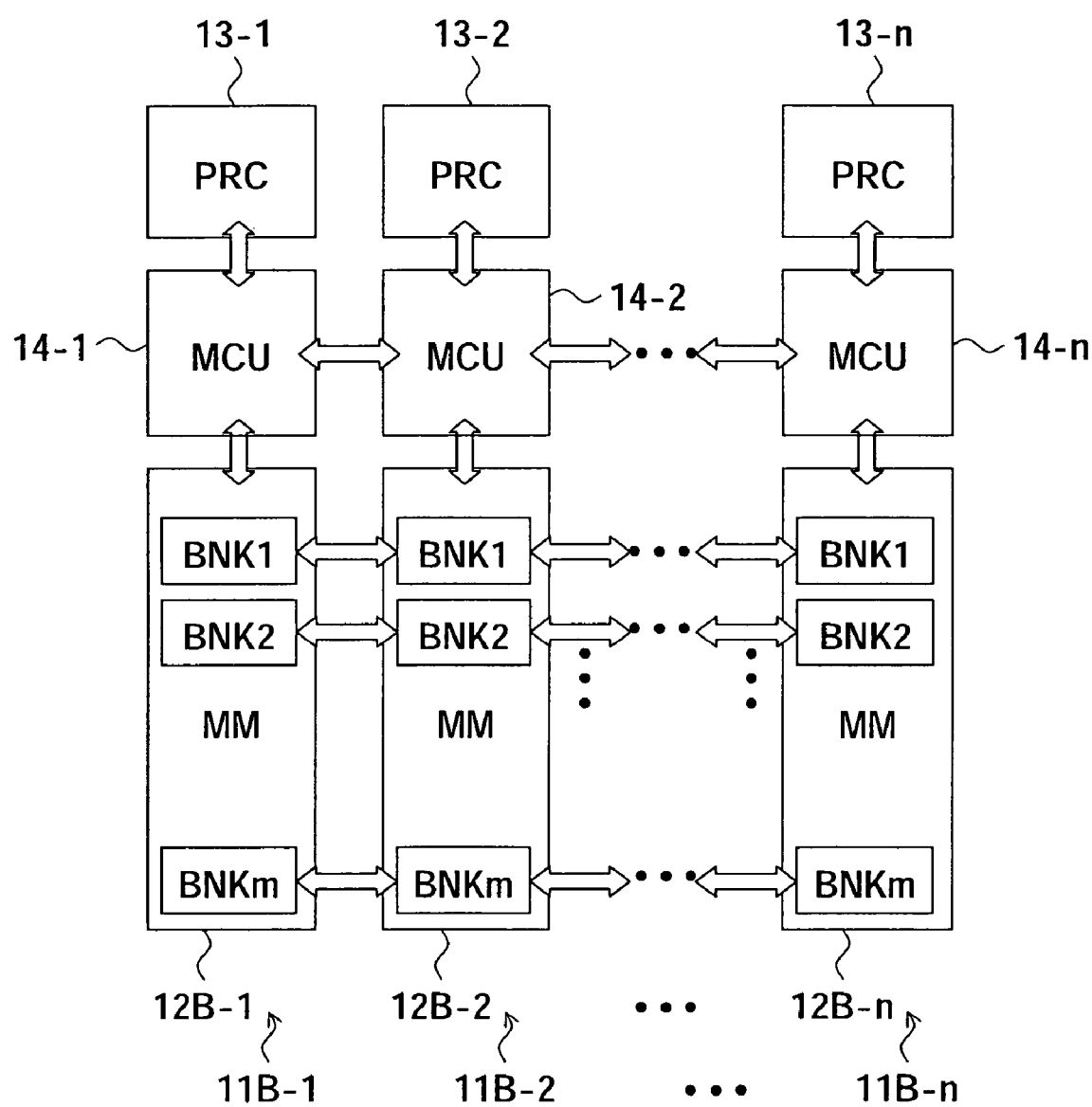
FIG. 12 is a view of the system configuration of a shared memory device according to a third embodiment of the present invention.

FIG. 12 is a view of a system configuration of a shared memory device according to a third embodiment of the present invention.

Figure 13:
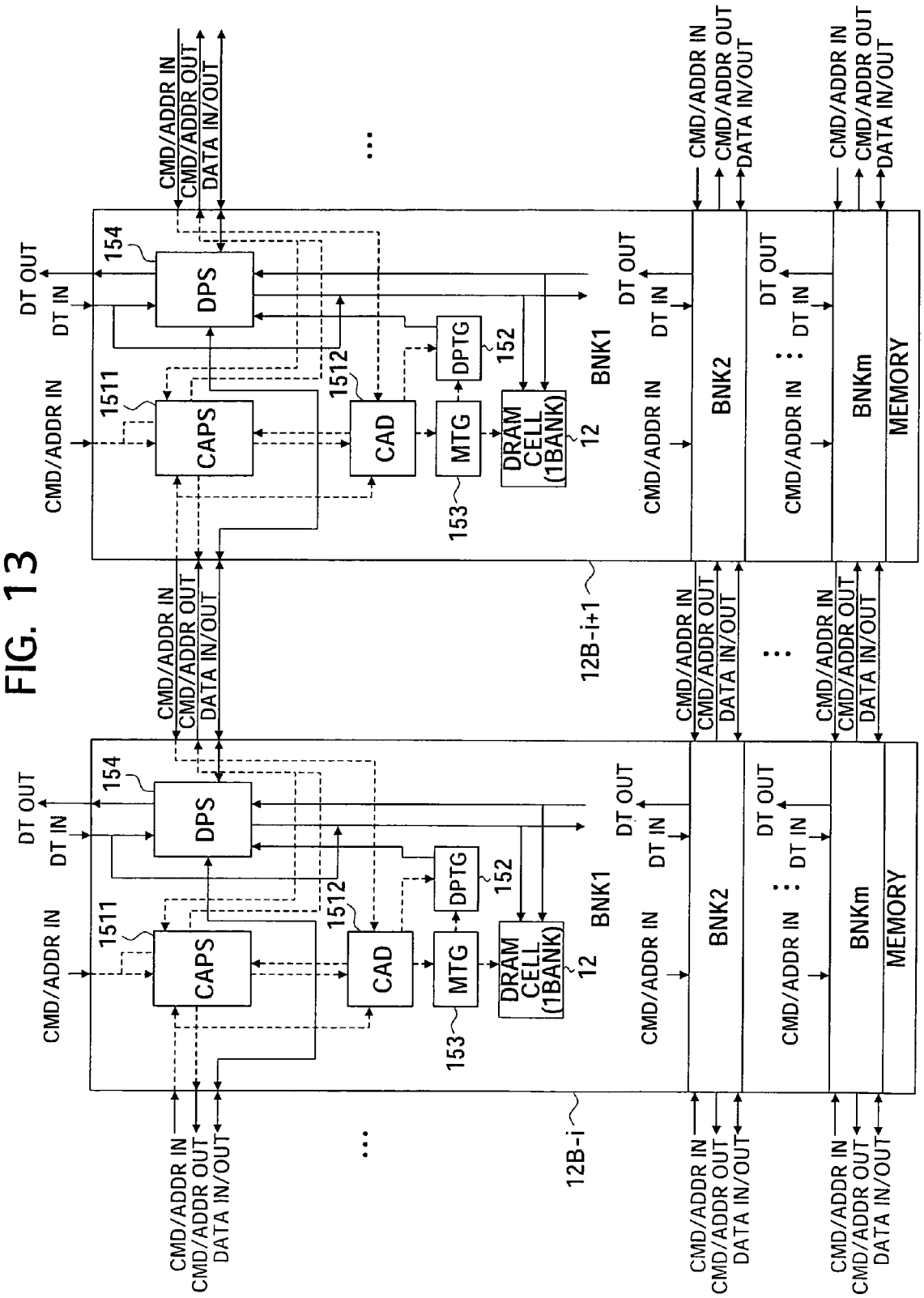
FIG. 13 is a view of a connection example between memory macros provided with a memory interface according to the third embodiment of the present invention.

FIG. 13 is a view of an example of connection between memory macros each provided with the memory interface according to the present embodiment.

A point that the third embodiment is different from the first embodiment is that each of memory macros 12B-1 to 12B-n has a plurality of banks BNK1 to BNKm and configured to be able to perform data transfer with corresponding banks of a different memory macro.

In this case, the memory interface 15 is arranged for each of the banks BNK1 to BNKm, and the basic configuration is the same as that explained with reference to FIG. 7 and FIG. 8. Therefore, a detailed explanation thereon will be omitted.

In the third embodiment, a data path timing generator 152 and a memory timing generator 153 are arranged for each memory interface of the banks.

Other configuration is the same as that in the first embodiment and, according to the third embodiment, the same effects as those in the first embodiment explained above can be obtained.

Fourth Embodiment

Figure 14:
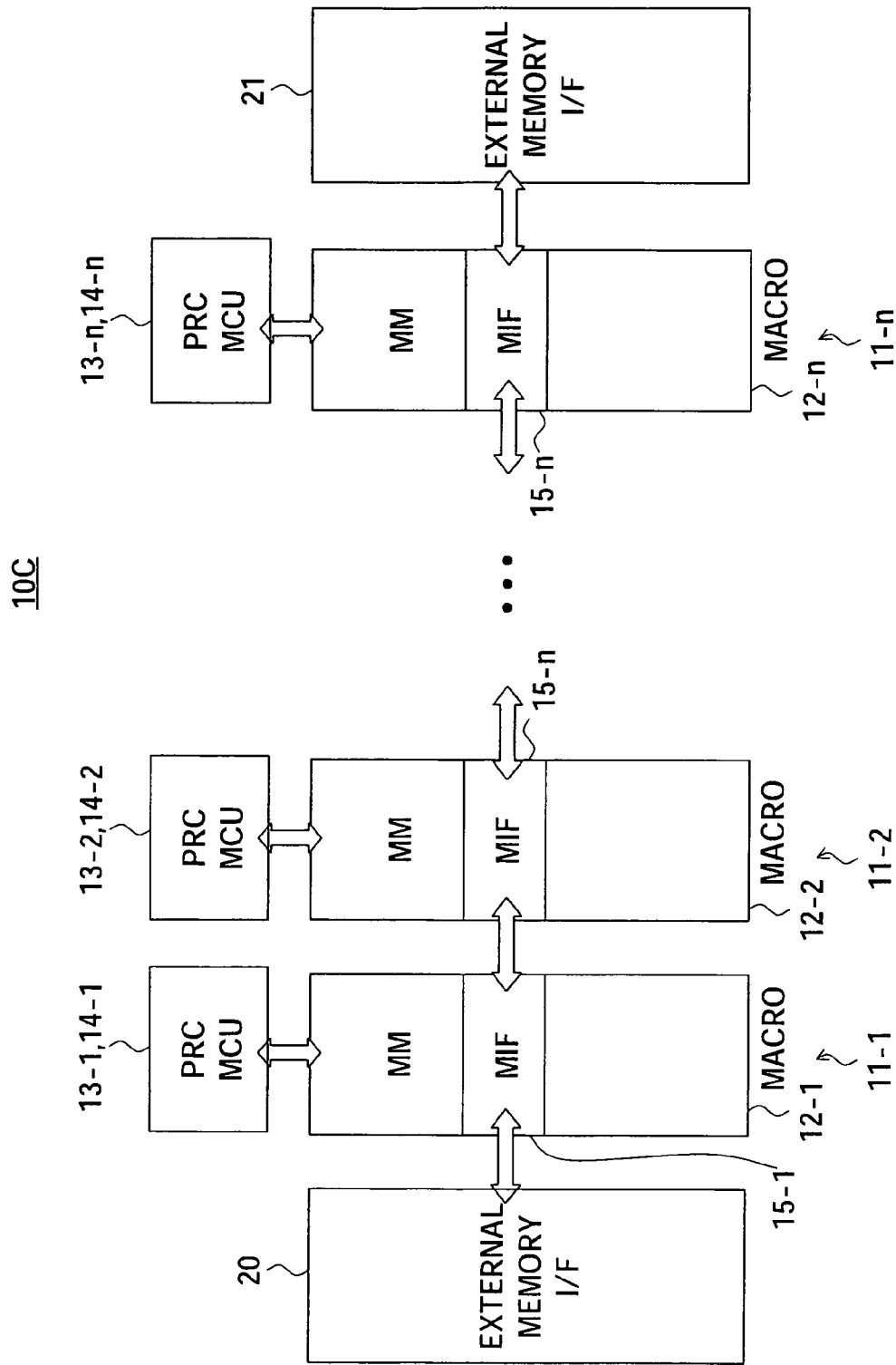
FIG. 14 is a view of a system configuration of a shared memory device according to a fourth embodiment of the present invention.

FIG. 14 is a view of a system configuration of a shared memory device according to a fourth embodiment of the present invention.

A point that the fourth embodiment is different from the first embodiment is that ports of the memory interface not used by the memory macro, specifically, an input/output portion (port) on the left side of the memory interface 15-1 provided to the memory macro 12-1 of the memory system 11-1 and an input/output portion (port) on the right side of the memory interface provided to the memory macro 12-n of the memory system 11-n in the first embodiment are used as interfaces with external memories 20 and 21.

Other configuration is the same as that in the first embodiment and, according to the fourth embodiment, not only the same effects as those in the first embodiment explained above can be obtained, but the effects below can be also obtained.

Generally, a system bus is used for data transfer to an external memory, so that it is highly possible that the bus becomes the neck of the peak performance.

On the other hand, according to the fourth embodiment, a load on the system bus can be reduced, consequently, there is an advantage of improving the processing capability.

Fifth Embodiment

Figure 15:
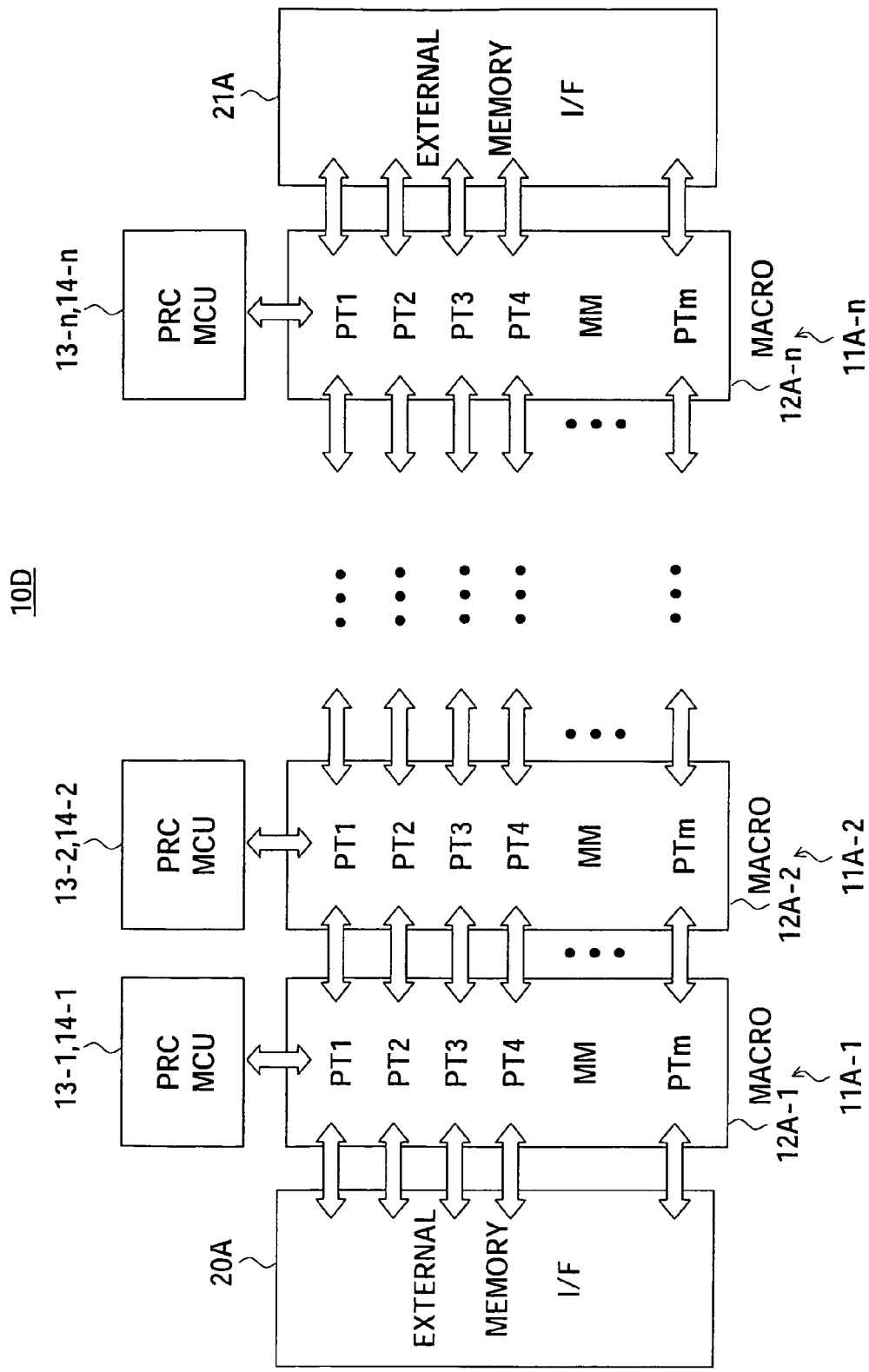
FIG. 15 is a view of a system configuration of a shared memory device according to a fifth embodiment of the present invention.

FIG. 15 is a view of a system configuration of a shared memory device according to a fifth embodiment of the present invention.

A point that the fifth embodiment is different from the second embodiment is that ports of the memory interface not used by the memory macro, specifically, an input/output portion (port) on the left side of the memory interface 15-1 provided to each port of the memory macro 12A-1 of the memory system 11-1 and an input/output portion (port) on the right side of the memory interface 15-n provided to each port of the memory macro 12A-n of the memory system 11-n in the second embodiment are used as interfaces with external memories 20A and 21A.

Other configuration is the same as that in the second embodiment and, according to the fifth embodiment, not only the same effects as those in the first and second embodiments explained above can be obtained, but the effects below can be also obtained.

Generally, a system bus is used for data transfer to an external memory, so that it is highly possible that the bus becomes the neck of the peak performance.

On the other hand, according to the fifth embodiment, a load on the system bus can be reduced, consequently, there is an advantage of improving the processing capability.

Sixth Embodiment

Figure 16:
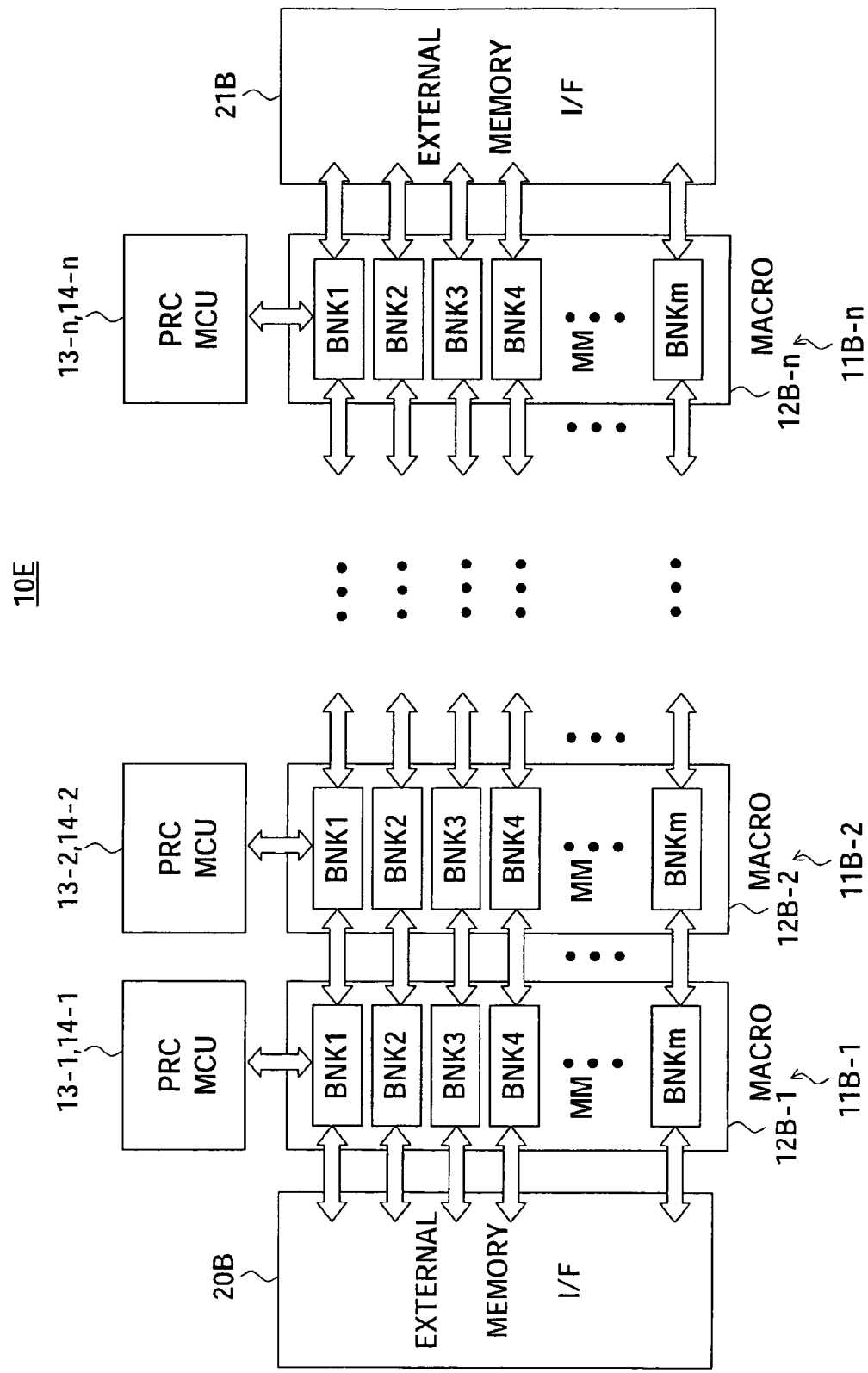
FIG. 16 is a view of a system configuration of a shared memory device according to a sixth embodiment of the present invention.
Figure 17:
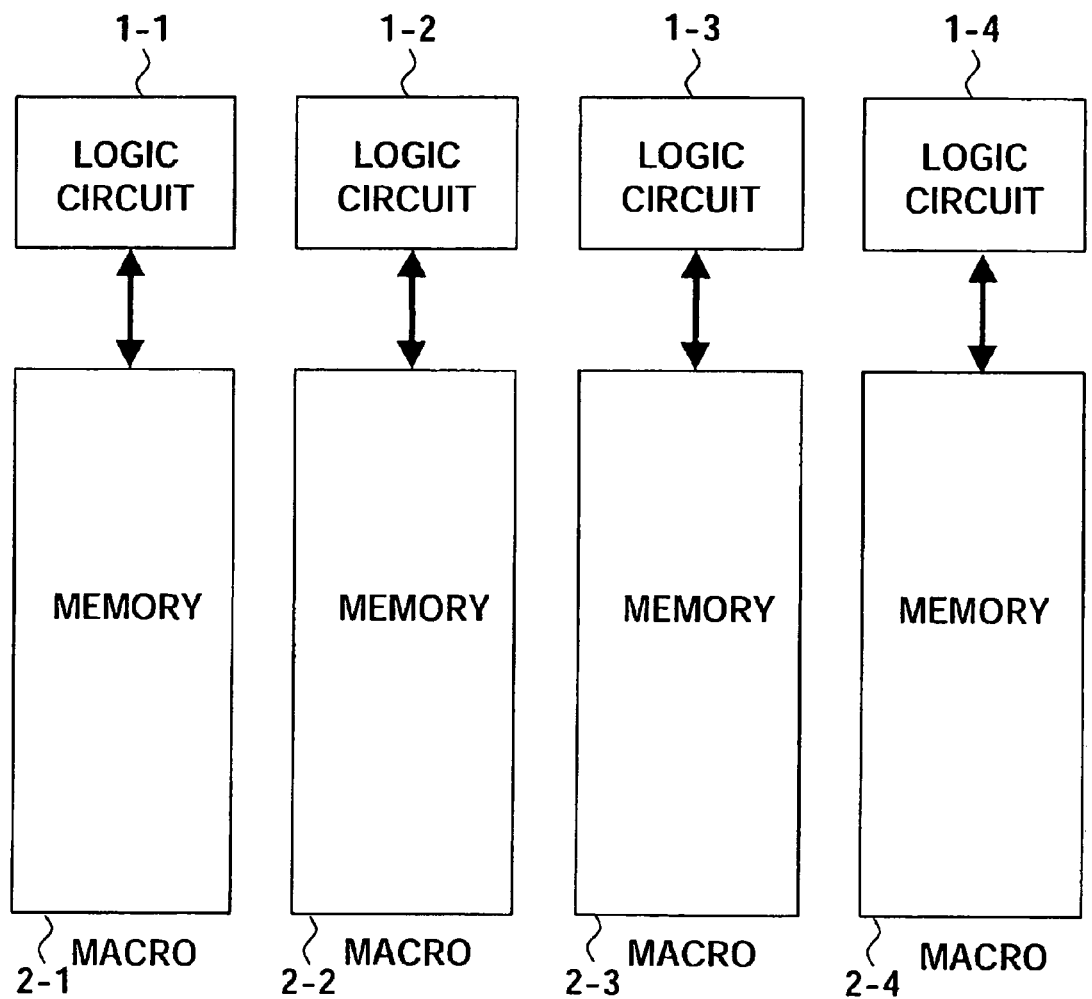
FIG. 17 is a view of a general architecture of a multiprocessor.
Figure 18:
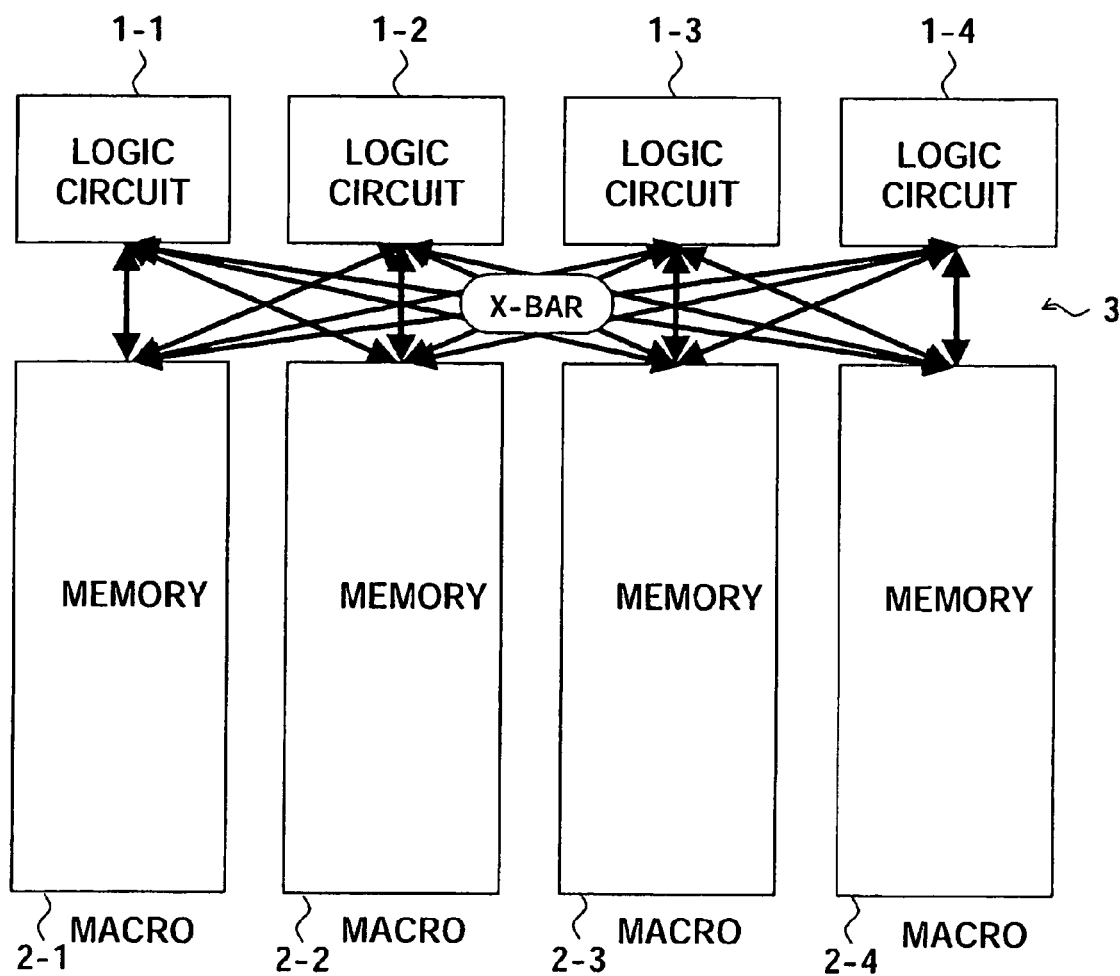
FIG. 18 is a view of an architecture using cross bars.

FIG. 16 is a view of a system configuration of a shared memory device according to a sixth embodiment of the present invention.

A point that the sixth embodiment differs from the third embodiment is that ports of the memory interface not used by the memory macro, specifically, an input/output portion (port) on the left side of the memory interface provided to each of the banks BNK1 to BNKm of the memory macro 12B-1 of the memory system 11B-1 and an input/output portion (port) on the right side of the memory interface provided to each of the banks BNK1 to BNKm of the memory macro 12B-n of the memory system 11B-n in the third embodiment are used as interfaces with external memories 20B and 21B.

Other configuration is the same as that in the third embodiment and, according to the sixth embodiment, not only the same effects as those in the first, second and third embodiments explained above can be obtained, but the effects below can be also obtained.

Generally, a system bus is used for data transfer to an external memory, so that it is highly possible that the bus becomes the neck of the peak performance.

On the other hand, according to the sixth embodiment, a load on the system bus can be reduced, consequently, there is an advantage of improving the processing capability.

As explained above, according to the embodiments of the present invention, data transfer is performed between memory macros through a memory interface capable of transferring data to a memory macro of each memory system.

Further, write broadcast is performed through data lines between memory macros, for example, when writing data to be accessed to memory macros of one or a plurality of memory systems.

Summarizing the effects of the embodiment of the present invention, according to the embodiments of the present invention, there are advantages that wiring to a memory can be simplified, a decline of performance due to an increase of the area and long wiring can be prevented, and extensibility of scalability of the system can be improved.

Further, according to the embodiments of the present invention, a processor can make an access to the closest local macro for data, consequently, there are advantages that unnecessary data transfer can be reduced, a load on the system bus can be reduced, and the processing capability can be improved.

It should be understood by those skilled in the art that various modifications, combinations, sub-combinations and alternations may occur depending on design requirements and other factors insofar as they are within the scope of the appended claims or the equivalents thereof.

What is claimed is:

1. A shared memory device, comprising:
a plurality of memory systems each including a memory macro, a processor, and a memory control unit, wherein within each memory system:
the memory control unit controls access to the memory macro,
the memory control unit transfers information between the processor and the memory macro, and transfers information to and from a memory control unit of a different memory system via a first set of data lines,
the memory macro includes a at least one port and at least one memory interface capable of transferring data to another memory macro;
corresponding ports of the memory macros of different memory systems are connected via a second set of data lines;
the at least one memory interface transfers data to the memory interface of another memory macro without transferring the data through the memory control unit and processor; and
the first set of data lines are distinct from the second set of data lines.

2. A shared memory device as set forth in claim 1, wherein within each memory system, when the memory system receives a command and an address for its own memory macro, the memory control unit:
decodes the input command, generates access timing for accessing the memory macro according to the command without causing an access collision, and
transfers the command and address to the memory macro based on the access timing.

3. A shared memory device as set forth in claim 1, wherein within each memory system, when the memory interface receives a command and an address from at least one of the processor and a first remote memory interface a memory macro of a first different memory system, the memory interface:
selects a data path based on whether the memory system has a path corresponding to the input command and address, and
transfers data relating to the input command and address from the memory macro to the memory control unit, or transfers data relating to the input command and address to a second remote memory interface at a second different memory system.

4. A shared memory device as set forth in claim 1, wherein at least one of the ports in the plurality of memory macros is connected to an external memory, that is not a shared memory device.

5. A shared memory device as set forth in claim 1, wherein write broadcast is performed via the second data lines between memory macros when by writing data to be accessed to memory macros of one or a plurality of different memory system.

6. A shared memory device, comprising:
a plurality of memory systems each including a memory macro including a plurality of banks, a processor, and a memory control unit for controlling an access to a memory macro, wherein within each memory system:
the memory control unit transfers information between the processor and memory macro and transfers information between a memory control unit of a different memory system via a first set of data lines;
each bank of the memory macro has a memory interface that transfers data to the memory interface of another bank without transferring the data through the memory control unit and processor; and
the memory interfaces of corresponding banks of the memory macros of the different memory systems are connected via a second set of data lines;
the first set of data lines being distinct from the second set of data lines.

7. A shared memory device as set forth in claim 6, wherein within each memory system, when the memory system receives a command and an address for its own memory macro, the memory control unit decodes the input command, generates access timing that does not cause any data collision, and transfers the command and address to the memory macro based on the access timing.

8. A shared memory device as set forth in claim 6, wherein within each memory system, when the memory interface receives a command and an address transferred from at least one of the processor and a first remote memory interface of a memory macro of a first different memory system, the memory interface:
selects a data path based on whether the memory system has a path corresponding to the input command and address, and
transfers data relating to the input command and address from the memory macro to the memory control unit or transfers data relating to the input command and address to a second remote memory interface at a second different memory system.

9. A shared memory device as set forth in claim 6, wherein at least one of the banks in the plurality of memory macros is connected to an external memory.

10. A shared memory device as set forth in claim 6, wherein write broadcast is performed via the second data lines between memory macros by writing data to one memory system and propagating the broadcast via the memory interface to a plurality of other memory systems.

11. A shared memory device, comprising:
a plurality of memory systems each including a memory macro, a processor, and a memory control unit for controlling an access to a memory macro, wherein within each memory system:
the memory control unit transfers information between the processor and the memory macro and the memory control unit transfers information with a memory control unit of a different memory system via a first set of data lines;
the memory macro has a memory interface that transfers data to a memory interface of another memory macro in another memory system without transferring the data through the memory control unit and pocessor; and
the memory interfaces of the memory macros of different memory systems are connected via a second set of data lines;
the first set of data lines being distinct from the second set of data lines.

12. A shared memory device as set forth in claim 11, wherein within each memory system, when the memory system receives a command and an address for its own memory macro, the memory control unit decodes the input command, generates access timing for accessing the memory macro according to the command without causing an access collision, and transfers the command and address to the memory macro based on the access timing.

13. A shared memory device as set forth in claim 11, wherein within each memory system, when the memory interface receives a command and an address from at least one of the processor and a first remote memory interface of a memory macro at a first different memory system, the memory interface:
selects a data path based on a whether this memory system has a path corresponding to the input command and address, and
transfers data relating to the input command and address from the memory macro to the memory control unit or transfers data relating to the input command and address to second remote memory interface at a second different memory system.

14. A shared memory device as set forth in claim 11, wherein at least one of the memory interfaces in the plurality of memory macros is connected to an external memory that is not a shared memory device.

15. A shared memory device as set forth in claim 11, wherein write broadcast is performed via data lines between memory macros by writing data to one memory system and propagating the broadcast via the memory interface to a plurality of other memory systems.

* * * * *